(12) United States Patent
Thien et al.

(10) Patent No.: US 11,892,960 B2
(45) Date of Patent: Feb. 6, 2024

(54) MULTI-KVM MULTI-CLIENT INFORMATION HANDLING SYSTEM SUPPORT

(71) Applicant: Dell Products L.P., Round Rock, TX (US)

(72) Inventors: Vui Khen Thien, Singapore (SG); Tze Fung Chung, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/667,079

(22) Filed: Feb. 8, 2022

(65) Prior Publication Data

US 2023/0251988 A1 Aug. 10, 2023

(51) Int. Cl.
*G06F 13/40* (2006.01)
*G06F 13/20* (2006.01)
*G06F 13/42* (2006.01)

(52) U.S. Cl.
CPC .......... *G06F 13/4022* (2013.01); *G06F 13/20* (2013.01); *G06F 13/4282* (2013.01); *G06F 2213/0042* (2013.01)

(58) Field of Classification Search
CPC .. G06F 13/4022; G06F 13/20; G06F 13/4282; G06F 2213/0042
USPC .......... 710/27, 31, 33, 36, 51, 300, 312, 316
See application file for complete search history.

(56) References Cited

U.S. PATENT DOCUMENTS

| | | | |
|---|---|---|---|
| 7,774,518 B2 | 8/2010 | Hseuh | |
| 8,244,824 B2 | 8/2012 | Garibaldi | |
| 8,627,219 B2 * | 1/2014 | Wang | H05K 7/1498 715/764 |
| 8,769,172 B2 * | 7/2014 | Soffer | G06F 13/105 710/64 |
| 9,904,655 B2 * | 2/2018 | Chang | G06F 13/4282 |
| 2006/0215687 A1 * | 9/2006 | Lee | H04L 12/44 370/463 |
| 2008/0162747 A1 * | 7/2008 | Chen | G06F 3/023 710/51 |

(Continued)

FOREIGN PATENT DOCUMENTS

KR 100828624 B1 5/2008

*Primary Examiner* — Idriss N Alrobaye
*Assistant Examiner* — Henry W Yu
(74) *Attorney, Agent, or Firm* — ZAGORIN CAVE LLP; Robert W. Holland (57) ABSTRACT

A display includes a keyboard, video mouse (KVM) switch that interfaces plural peripheral communication ports and plural information handling system ports. The KVM switch in a first configuration accepts video from one of the information handling system ports for presentation as visual images at a display panel and interfaces all of the plural peripheral communication ports with the one of the information handling system ports. When an end user commands a change to a different information handling system port and the KVM switch detects that a predetermined information transfer is taking place at the one of the information handling system ports, such as a bulk isochronous transfer or greater than a predetermined bandwidth utilization, the KVM switch changes the interface of peripheral devices and video to the second information handling system port while maintaining the transfer of the predetermined type of information with the first information handling system port.

20 Claims, 4 Drawing Sheets

(56) References Cited

U.S. PATENT DOCUMENTS

| | | | |
|---|---|---|---|
| 2009/0094393 A1* | 4/2009 | Kobayashi | G06F 3/023 710/69 |
| 2009/0288042 A1 | 11/2009 | Cheng | |
| 2010/0180055 A1* | 7/2010 | Lyon | G06F 3/038 710/316 |
| 2011/0010473 A1* | 1/2011 | Szolyga | G06F 3/023 710/36 |
| 2011/0145451 A1* | 6/2011 | Soffer | G06F 3/023 710/64 |
| 2018/0239719 A1* | 8/2018 | Soffer | G06F 13/4022 |
| 2020/0026675 A1* | 1/2020 | Chen | G06F 13/4282 |

* cited by examiner

MULTI-KVM MULTI-CLIENT INFORMATION HANDLING SYSTEM SUPPORT

BACKGROUND OF THE INVENTION

Field of the Invention

The present invention relates in general to the field of information handling system peripheral interface support, and more particularly to a multi-KVM multi-client information handling system support.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components disposed in a housing, such as a central processing unit (CPU) that executes instructions in cooperation with a random access memory (RAM) that stores the instructions and information. Stationary information handling systems, such as desktops, towers and servers, typically interact with end users through peripheral input/output devices, such as peripheral displays, keyboards and mice. Portable information handling systems typically integrate a keyboard, display and pointing device, such as a touchpad, and also typically interface with peripheral devices. In addition, information handling systems also typically interact with a variety of resources through communications ports. For instance, an RJ45 network port interfaces with a network resource through Ethernet, and USB ports provide interfaces with storage devices and other resources.

To help simplify end user interactions with different information handling systems, peripheral displays sometimes include keyboard, video mouse (KVM) switches. Peripheral devices, such as a keyboard and mouse, couple to ports of the display, such as USB ports, and route through the KVM switch to an information handling system coupled to another port of the display. In addition, an RJ-45 network port provides a network interface into the KVM port that provides network communication through the KVM switch to the information handling system. Such a configuration is often used by information technology professionals who remotely manage server information handling systems through network communication. For instance, the server information handling system directly drives video presented on the display and accepts inputs made through the keyboard and mouse. Although KVM switches are helpful for server information handling system management, KVM switches also help in a client environment, such as in an enterprise cube environment where a display supports interfaces with peripheral devices so that an end user can interact with the peripheral devices by interfacing with the display. In some instances, the KVM switch supports interfaces with multiple information handling systems so that an end user can select which of plural information handling systems to use with the peripherals. For example, one port of the display interfaces with a stationary information handling system while a second port is available for the end user to interface a portable information handling system. When the end user needs heavy lifting, such as CAD visualizations, the end user selects interaction with the stationary system; and when the end user needs local personal data, the end user selects interaction with the portable system.

One difficulty that arises when a display KVM switch interfaces with multiple information handling systems is that an information handling system may have operations ongoing when an end user selects a different system to interact with the display and peripherals. The end user may use care in selecting different systems so that any on-going tasks are complete, however, this tends to disrupt the end user's interactions and workflow. For instance, the end user typically has to complete and close out operations of one information handling system before selecting the other information handling system for use at the KVM switch. Often, more complex tasks take time to perform without end user involvement, such as retrieving large files, which offers an end user an opportunity to perform alternative tasks while waiting, such as email review or web browsing. If the alternative tasks are on a different information handling system than the time-intensive tasks, such as a stationary system for the latter and portable system for the former, the end user generally has to wait for the time-intensive tasks to complete or has to use different I/O devices to perform the alternative tasks, such as by performing alternative tasks at the portable system with integrated I/O devices while the peripheral devices of the KVM switch are tied to the stationary system.

SUMMARY OF THE INVENTION

Therefore, a need has arisen for a system and method which allocates resources associated with a KVM switch between plural information handling systems.

In accordance with the present invention, a system and method are provided which substantially reduce the disadvantages and problems associated with previous methods and systems for interfacing a KVM switch and information handling system. A KVM switch included in a peripheral display manages peripheral communication ports so that the display supports only a selected one of plural information handling systems and simultaneous interfaces with plural of the information handling systems by interfacing different portions of the peripheral communication ports to different of the plural information handling systems, such as to interface HID peripherals with a first information handling system and non-HID peripherals with a second information handling system.

More specifically, plural information handling systems interface with a display through information handling system communication ports of the display. Plural peripherals interface with the display through peripheral communication ports of the display and selectively interface with a selected of the plural information handling systems managed by a KVM switch of the display. An end user may toggle between selection of the information handling systems so that the KVM switch interfaces all of the peripheral devices with only one information handling system at a time. A processing resource of the display monitors the peripheral devices to determine the type of information transferred from the peripheral devices to the information handling system, such as by detecting bulk/isochronous information transfers and/ or transfers that use a predetermined utilization rate of available bandwidth. If an end user selects to change the information handling system that interfaces with the peripherals while a bulk/isochronous transfer is taking place and/or greater than a predetermined utilization rate is used, the end user is provided with a notification that the selected change of information handling systems may interrupt an information transfer. Alternatively, the processing resource may maintain the data transfer by keeping the existing information handling system interface with non-HID peripherals while changing to the selected information handling system with HID peripherals. For example, an end user selection of a change to a new information handling system interface commands the portion of the KVM switch communication ports associated with HID peripherals, such as a keyboard and mouse, to change to the newly selected information handling system while the existing information handling system interface is maintained for network and peripheral storage devices coupled to the display peripheral communication ports.

The present invention provides a number of important technical advantages. One example of an important technical advantage is that a KVM switch included in a display seamlessly supports selection of one and/or plural information handling systems to interface with all or portions of peripheral communication ports of the display. Managing selection of communication ports to interface with plural information handling systems allows an end user to interact with HID peripherals for a first information handling system while a second information handling system interacts with non-HID peripherals. For instance, an end user may interface a portable information handling system and desktop information handling system to a display having a first portion of communication ports interfaced with HID peripherals, such as a keyboard and mouse, and a second portion of communication ports interfaced with non-HID peripherals, such as network communication device. The end user can maintain the desktop information handling system interface with the network communication device while simultaneously using the keyboard and mouse with the portable information handling system. This allows the end user to engage in tasks with the desktop information handling system that use the network interface of the KVM switch while changing the mouse and keyboard for use with both the desktop and portable information handling system as desired.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Plural information handling systems selectively interface through a KVM switch included in a display with plural peripheral devices. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
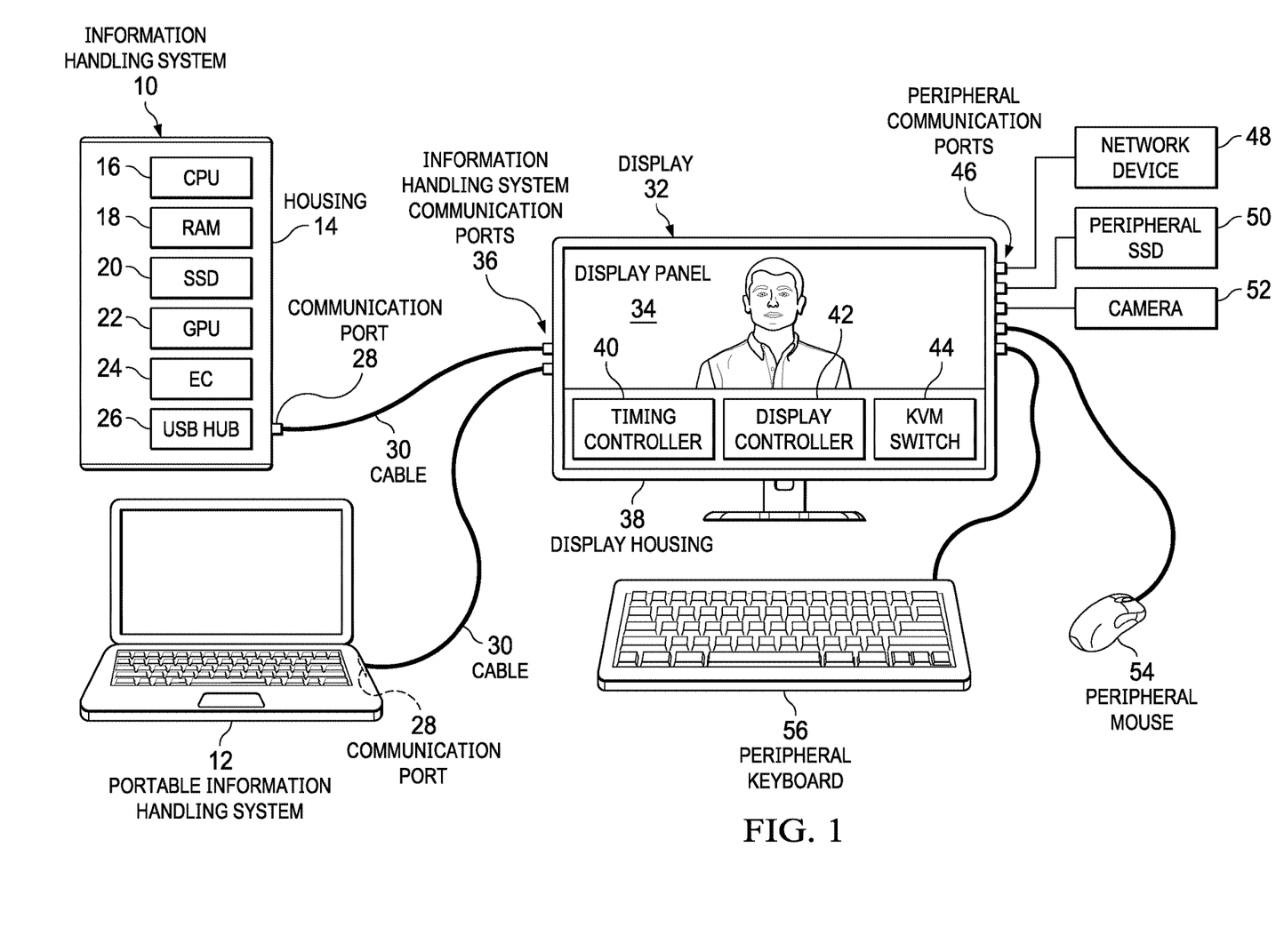
FIG. 1 depicts a block diagram of plural information handling systems selectively interfaced through a display KVM switch with plural peripheral devices.

Referring now to FIG. 1, a block diagram depicts plural information handling systems 10 and 12 selectively interfaced through a display KVM switch 44 with plural peripheral devices. In the example embodiment, information handling system 10 has a stationary configuration built in a housing 14, such as supports a desktop or server system, and information handling system 12 has a portable configuration to support mobile use. Information handling system 10 illustrates an example of processing components included in housing 14 to cooperate to process information. For example, a central processing unit (CPU) 16 executes instructions that process information. A random access memory (RAM) 18 stores the information and instructions. A solid state drive (SSD) 20 includes non-transitory memory that provides persistent storage of instructions and information, such as an operating system and applications that execute on CPU 16. A graphics processing unit (GPU) 22 interfaces with CPU 16 to further process information for presentation as visual images at a display, such as by defining pixel values. An embedded controller (EC) 24 manages physical systems at information handling system 10, such as application of power, maintaining thermal constraints and interacting with input/output devices. A USB hub 26 interfaces with CPU 16 to communicate with external devices through a USB communication port. Although the example embodiment includes a USB hub 26 and USB communication port 28, other types of communication hubs and ports may be used. In the example embodiment, portable information handling system 12 may have similar processing component configurations to those of the stationary information handling system 10, however the portable housing integrates input and output devices, such as display and keyboard. Although portable information handling system 12 includes integrated input and output devices, peripheral input and output devices may be interfaced for end user convenience.

Information handling systems 10 and 12 interface through communication ports 28 and cables 30 with a display 32 having a display panel 34 that presents visual images provided by GPU 22. For instance, pixel values provided through information handling system communication ports 36 are provided to a timing controller 40 that scans the pixel values to display panel 34 for presentation of the visual images. A display controller 42 (typically referred to as a scaler) scales the visual images for the resolution of display panel 34 and includes a processing resource that manages presentation of visual images at the display panel, such as by selection of which of information handling system communication ports 36 is selected to present visual images. Display 32 has a display housing 38 that supports display 32 as a peripheral display configuration that interfaces with peripheral input devices that accept end user inputs and communicate the end user inputs to a selected of information handling system 10 and 12. Display 32 offers a workstation of sorts at which an end user may select either of information handling system 10 or 12 to present visual images and interact with the peripheral devices. To manage end user selections of the information handling system and peripherals, a processing resource of display controller 42 controls a keyboard, video, mouse (KVM) switch 44 to select how communication is managed between display 32 and information handling systems 10 and 12. In the example embodiment, KVM switch 44 interfaces with plural peripheral communication ports 46 that interface with a variety of peripheral devices. The example embodiment interfaces with a network device peripheral 48 that provides network communications, such as a switch or router, a peripheral SSD 50 that stores information, a peripheral camera 52 that captures visual images, a peripheral mouse 54 that accepts pointing device inputs and a peripheral keyboard 56 that accepts typed inputs.

KVM switch 44 has a hybrid architecture that supports a first configuration having only one of the information handling systems interacting with display 32 and a second configuration that splits the peripheral devices so that both of the information handling systems selectively interface with the peripheral devices. For example, a group of human interface devices (HIDs) are managed separately from non-HIDs by KVM switch 44 so the two different information handling systems 10 and 12 can each separately interact with one of the HID and non-HID groups simultaneously. For instance, information handling system 10 initiates interactions with display 32 to present visual images at display panel 34, interface with a network through network device 48 and accept end user inputs through peripheral mouse 54 and peripheral keyboard 56. When an end user selects portable information handling system 12 to present visual images at display 32 and interact with peripheral keyboard 56, KVM switch 44 changes to a multi-system mode having portable information handling system 12 interfaced with HID peripherals like the keyboard and mouse while maintaining the non-HID peripheral interfaces so that stationary information handling system 10 maintains the network interface. The separate KVM interfaces may be established automatically, such as by detecting that the network interface is performing a bulk/isochronous download or is active with greater than a predetermined network interface utilization. Alternatively, when an existing KVM supported interface meets predetermined factors, such as a defined transfer or utilization, the end user may be provided with a notification of the existing use before the change in KVM switch configuration is initiated. When only one information handling system is interfaced with display 32, KVM switch 44 disables the multi-system configuration so that the one interfaced information handling system automatically has all available display resources assigned.

Figure 2:
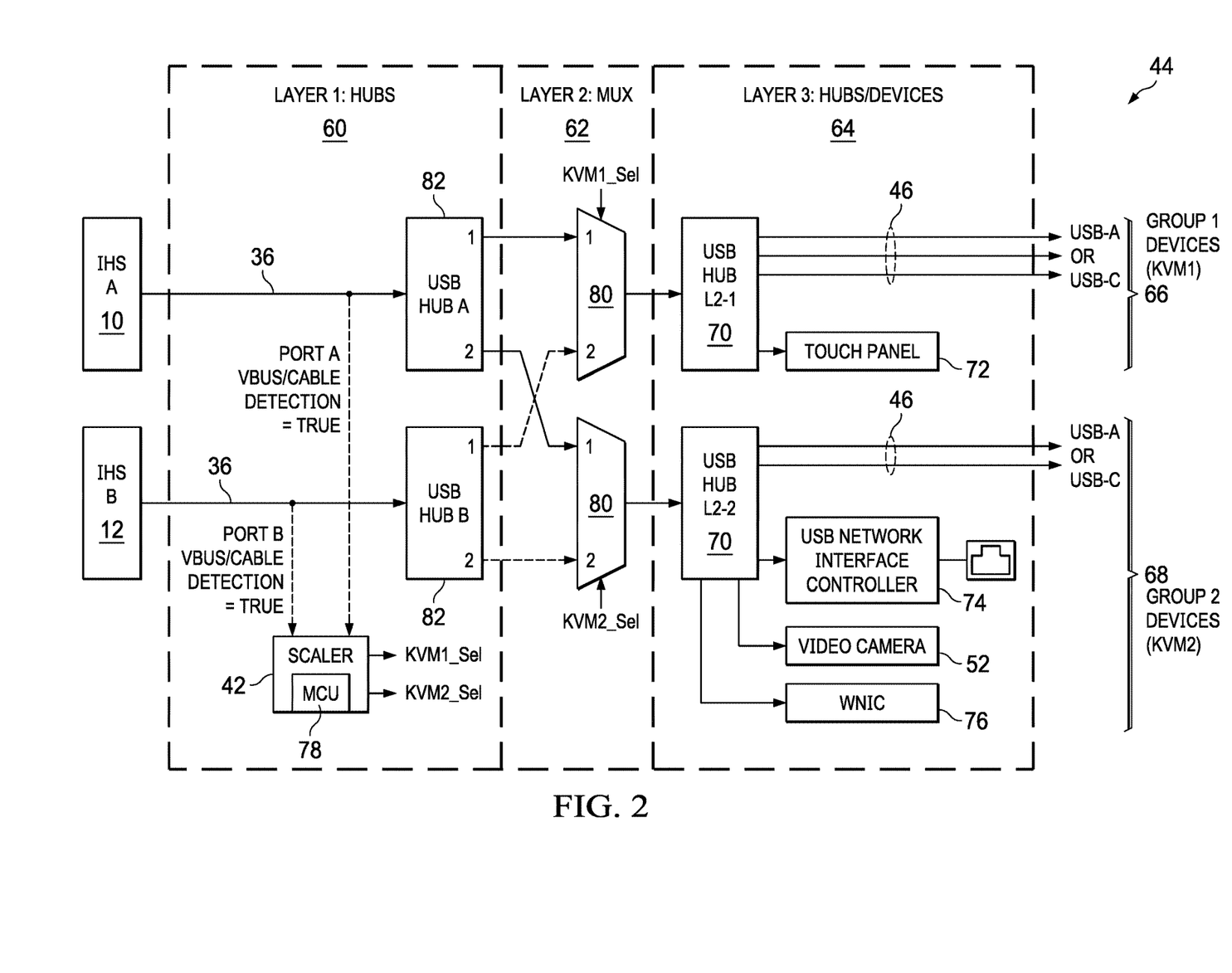
FIG. 2 depicts a block diagram of a KVM switch configured to support simultaneous multi-system interfaces split between HID and non-HID peripherals, where KVM1 can be used to interface to USB HID input devices, such as an external peripheral keyboard and mouse, and KVM2 can be used for connecting to other devices where persistent connection with an information handling system is desired independent of the information handling system used by an end user for inputs.

Referring now to FIG. 2, a block diagram depicts a KVM switch 44 configured to support simultaneous multi-system interfaces split between HID and non-HID peripherals, where KVM1 can be used to interface to USB HID input devices, such as an external peripheral keyboard and mouse, and KVM2 can be used for connecting to other devices where persistent connection with an information handling system is desired independent of the information handling system used by an end user for inputs. KVM switch 44 has a hub layer 60 with two or more communication hubs 82, such as USB hubs. Each information handling system port 36 interfaces with a dedicated communication hub 82 and with display controller 42, which includes a processing resource 78, such as an MCU. Hub layer 60 interfaces with a mux layer 62 having first and second multiplexers 80 that interface with communication hubs 82 and receive control signals from processing resource 78. Mux layer 62 interfaces with a hub and devices layer 64 that organizes peripheral communication ports 46 into a first group 66 having HID peripheral ports and a second group 68 having non-HID peripheral ports. Each of group 66 and group 68 interfaces with a communication hub 70, such as a USB communication hub, that in turn each interfaces with a multiplexer 80. In the example embodiment, the HID group 66 includes a touch panel detector 72 that reports touch inputs made at the display panel. Non-HID group 68 includes a USB to network controller 74 that converts information for exchange with an RJ-45 Ethernet jack, a video camera 52 that captures visual images, and a wireless network interface controller 76 supports wireless communications, such as with WiFi or Bluetooth. Under the management of processing resource 78 selection at multiplexers 80 inputs KVM1_Sel and KVM2_Sel, each information handling system communication port 36 may be selectively interfaced with one or both of groups 66 and 68. Further, the change of a group 66 or 68 may be commanded individually so that both information handling systems interface with one of the groups.

Figure 3:
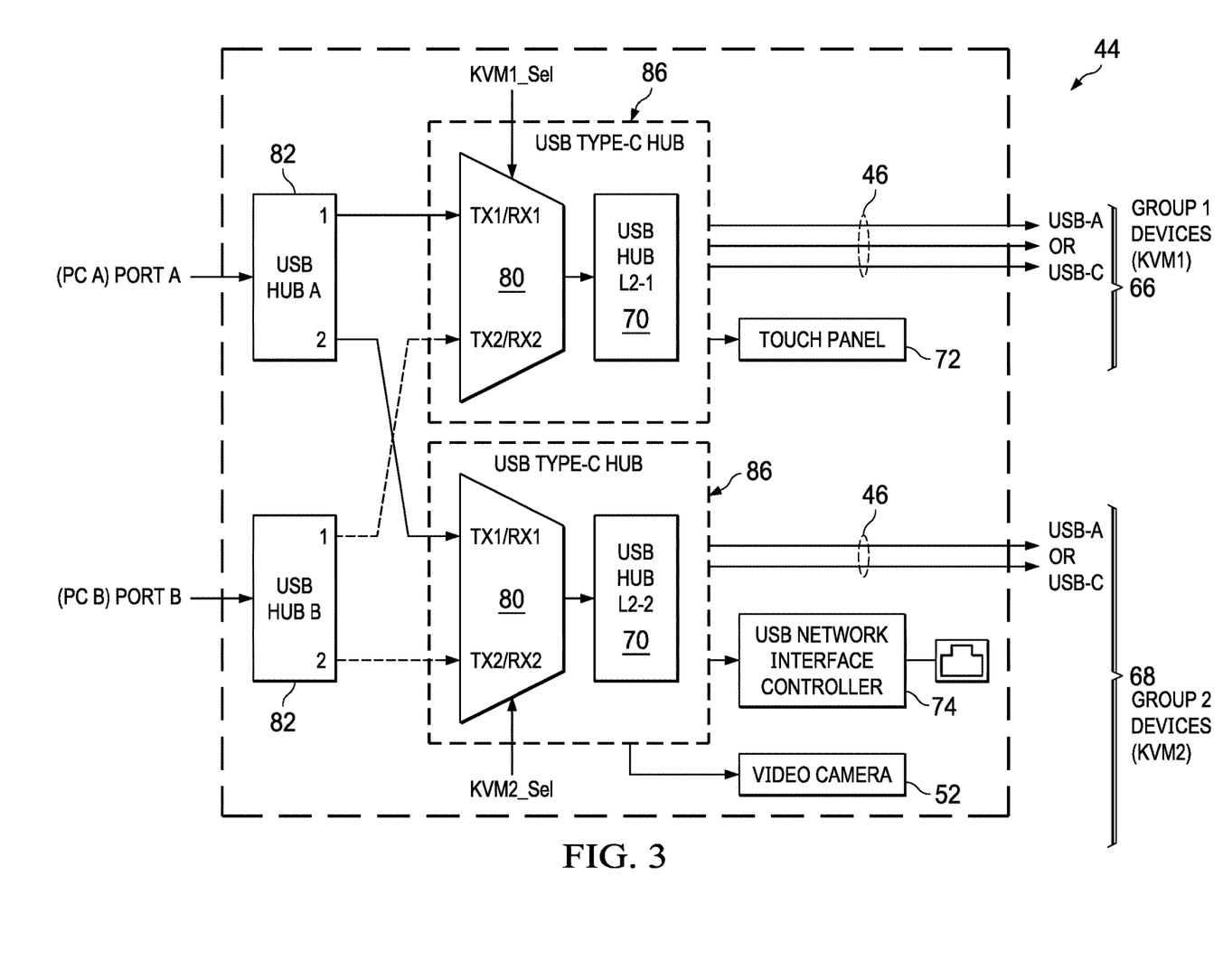
FIG. 3 depicts a block diagram of an alternative embodiment of a KVM switch configured to support simultaneous multi-system interfaces split between HID and non-HID peripherals.

Referring now to FIG. 3, a block diagram depicts an alternative embodiment of KVM switch 44 configured to support simultaneous multi-system interfaces split between HID and non-HID peripherals. In the alternative embodiment, a USB Type C communications hub 86 is disposed between the HID group 66 and non-HID group 68 of communication ports and the communication hubs 82 dedicated to each information handling system communication port. The USB Type C communication hubs 86 essentially includes an integrated 2:1 multiplexer that manages the transmission and receive data lanes. As described above HID devices, such as touch panel 72, may be assigned for communication to one information handling system while non-HID devices, such as a video camera 52 and USB to network interface controller 74 simultaneously communicate with a separate information handling system. In both the example embodiment of FIG. 2 and FIG. 3, when only one information handling system is detected coupled to display 32, the selection of separate communications ports by KVM switch 44 may be disabled to prevent unexpected partial information transfer configurations.

Figure 4:
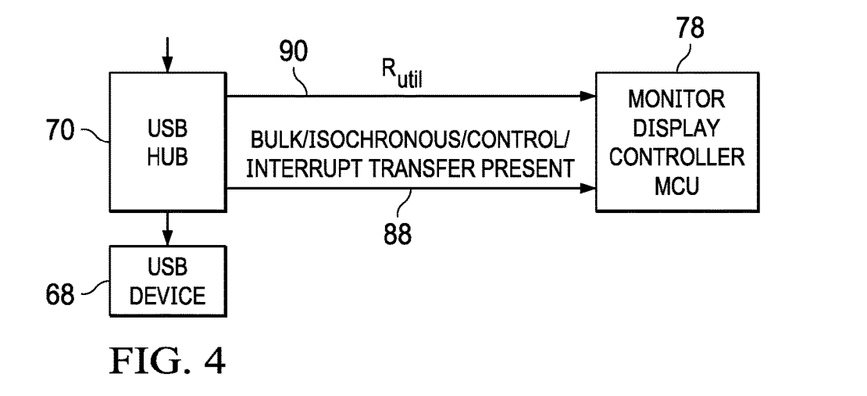
FIG. 4 depicts a block diagram of an example of a system that manages assignment of different groups of peripheral communication ports to different information handling systems.

Referring now to FIG. 4, a block diagram depicts an example of a system that manages assignment of different groups of peripheral communication ports to different information handling systems. A processing resource 78 of the display, such as a controller MCU within the display controller, receives information from USB communication hubs regarding the type of information communicated by USB devices of non-HID group 68. In the example embodiment, one type of information provided by USB communication hub 70 is that a bulk/isochronous, control or interrupt information 88 transfer is present. As an example a large file transfer or similar data transfer is detected at USB communication hub 70 and communicated to processing resource 78. As another example, a capacity utilization 90 of USB communication hub 70 or its communication links is provided to processing resource 78. For example, capacity utilization is measured as a percentage over a measured period of time where the USB link is not idle. Processing resource 78 monitors activity at non-HID communication ports and, when a change of information handling system is selected by an end user for the KVM switch, the change is delayed to allow completion of the data transfer. In one example embodiment, processing resource 78 switches HID communication ports as requested by the end user but delays the change for the non-HID ports until the bulk/isochronous transfer is complete or the capacity utilization drops. In another example embodiment, the end user is informed about the risk of data interruption and asked to confirm the change to the information handling system communication port before the KVM switch performs the change. Alternatively, the end user may be asked to confirm a complete change of all peripherals to the newly selected information handling system or a partial change so that the non-HID communication ports remain interfaced with the original information handling system. As an example, an end user may select to automatically leave the non-HID communication ports interfaced with the stationary information handling system where the portable information handling system has a WiFi network interface and does not need the network interface available through the KVM switch.

Figure 5:
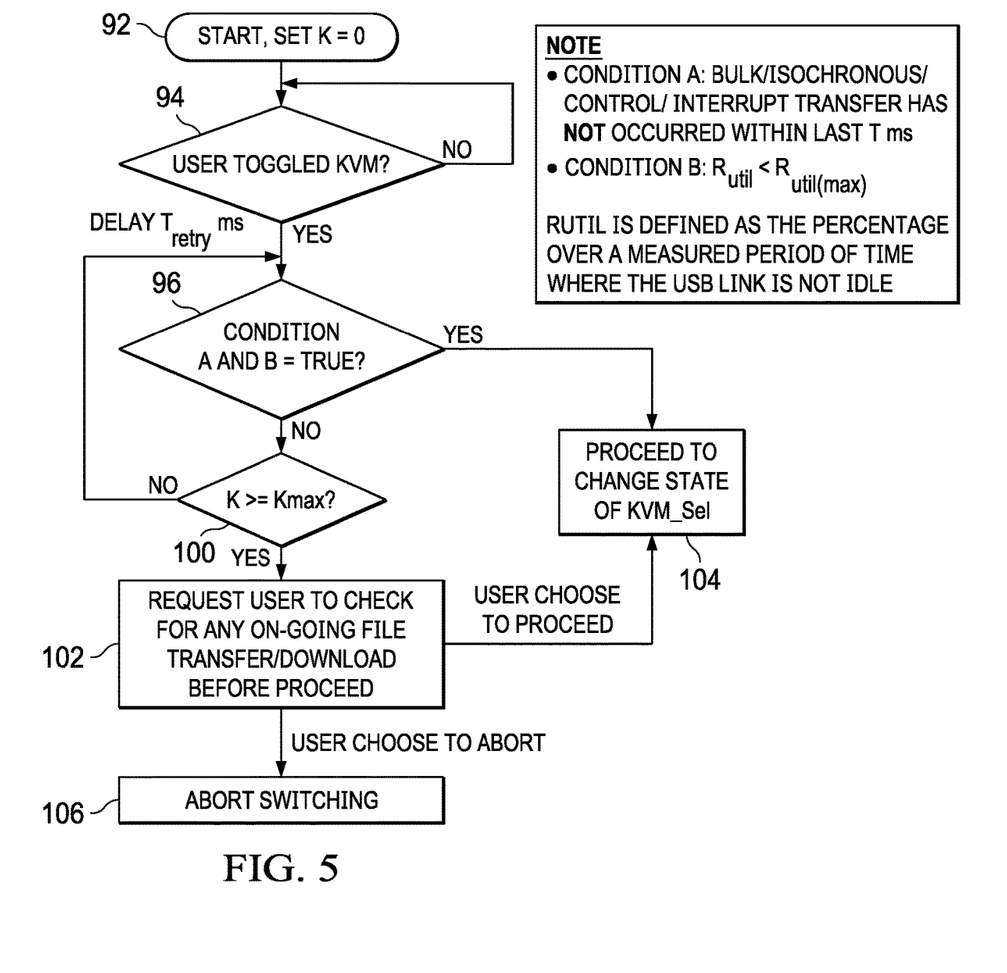
FIG. 5 depicts a flow diagram of a process for assigning HID and non-HID communication ports to selected of plural information handling systems.

Referring now to FIG. 5, a flow diagram depicts a process for assigning HID and non-HID communication ports to selected of plural information handling systems. The process starts at step 92 setting a counter k to zero. At step 94 a determination is made of whether an end user has toggled the KVM switch to change the information handling system that interfaces with peripheral devices coupled to the display. If not, the process returns to step 92 to continue monitoring for an end user selection to change the information handling system interface. If the end user has selected a change to the information handling system interface, the process continues to step 96 to determine if a bulk/isochronous/control/interrupt transfer has occurred within a defined time period, and whether the USB link utilization rate is within a certain threshold percentage. In the example embodiment, USB link utilization rate is the ratio of the time where the USB link is occupied with USB transfers to the total time interval measured. If both conditions are true, the process continues to step 104 to perform the change requested by the end user. If either of conditions A or B are not true, the process continues to step 100 to determine if the counter reached a predefined minimum value, $K_{MAX}$. From step 100, if the counter is less than $K_{MAX}$, the process increments the counter and returns to step 96 after a predefined delay of a time $T_{RETRY}$ to monitor conditions A and B. Once the counter reaches $K_{MAX}$, indicating that capacity utilization has remained above the defined level, the process continues to step 102 to inquire with the end user whether to proceed with the change of the selected information handling system to interface with the peripheral communication ports. If the end user elects to change the information handling system selection, the process completes at step 104. If the end user elects not to perform the change, the process aborts at step 106, or alternatively, changes the HID peripherals while leaving the non-HID peripherals unchanged.

Although the present invention has been described in detail, it should be understood that various changes, substitutions and alterations can be made hereto without departing from the spirit and scope of the invention as defined by the appended claims.

What is claimed is:

1. An information handling system comprising:
  a housing;
  a processor disposed in the housing and operable to execute instructions that process information;
  a memory disposed in the housing and operable to store the instructions and information;
  a first set of one or more communication ports disposed in the housing and interfaced with the processor;
  a peripheral display separate from the housing and having a second set of one or more communication ports, the peripheral display interfaced with the processor by a cable coupled between one of the first set of communication ports and one of the second set of communication ports, the peripheral display operable to present the information as visual images;
  plural peripheral devices interfaced with the second set of communication ports, the peripheral devices including a set of human interface devices (HID) and a set of non-HID; and
  a KVM switch interfaced with the second set of communication ports and operable to selectively interface all of the plural peripheral devices with the one of the first set of communication ports, none of the plural peripheral devices with the one of the first set of communication ports, and some but not all of the plural peripheral devices with the one of the first set of communication ports, the KVM switch having a first communication hub interfaced with the HID, a second communication hub interfaced with the non-HID, and third and fourth communication hubs, each of the third and fourth communications hubs interfaced with both the first and second communication hubs and configured to interface with the first set of one or more communications ports to selectively interface the HID and non-HID with the processor.

2. The information handling system of claim 1 wherein: one of the plural peripheral devices comprises a keyboard HID;

another one of the plural peripheral devices comprises a network interface non-HID; and when some but not all of the plural peripheral devices communicate with the one of the first set of communication ports, only one of the keyboard HID and the network interface non-HID communicate with the one of the first set of communication ports.

3. The information handling system of claim 1 wherein the KVM switch comprises:
   a first multiplexer interfaced with a first portion of the second set of communication ports; and
   a second multiplexer interfaced with a second portion of the second set of communication ports;
   wherein a third portion of the second set of communication ports selectively interface with each of plural information handling systems.

4. The information handling system of claim 3 wherein the KVM switch further comprises:
   a processing resource operable to execute instructions; and
   a non-transitory memory interfaced with the processing resource and storing instructions that when executed on the processing resource cause:
   monitoring a type of information transfer through the third portion of the second set of communications ports;
   detecting an end user selection change for a communication interface from a first of the plural information handling systems to a second of the plural information handling systems; and
   in response to the end user selection, presenting at the display a notification when the type of information transfer is a predetermined type.

5. The information handling system of claim 4 wherein the predetermined type comprises one or more of a bulk, isochronous, control or interrupt information transfer.

6. The information handling system of claim 4 wherein the predetermined type comprises communication with lower than a predetermined utilization.

7. The information handling system of claim 4 wherein the instructions further cause in response to the end user selection and the information transfer of the predetermined type:
   the first portion of the second set of communication ports to interface with the first of the plural information handling systems; and
   the second portion of the second set of communication ports to interface with the second of the plural information handling systems.

8. The information handling system of claim 7 further comprising:
   a first communication hub disposed between the first multiplexer and the first portion of the second set of communication ports; and
   a second communication hub disposed between the second multiplexer and the second portion of the second set of communication ports;
   wherein the instructions selectively command the first and second multiplexer to interface all of the second set of communication ports with the first information handling system, all of the second set of communication ports with the second information handling system.

9. The information handling system of claim 8 wherein the instructions further:
   selectively command the first communication hub to interface with the first of the plural information handling systems while the second communication hub interfaces with the second of the plural information handling systems; and
   selectively command the second communication hub to interface with the first of the plural information handling systems while the first communication hub interfaces with the second of the plural information handling systems.

10. A method for managing plural information handling system interfaces with a display KVM switch, the method comprising:
    communicating information from plural peripherals to the display KVM switch through plural communication ports of the display, information communicated from human interface device (HID) peripherals to a first communication hub and information communicated from non-human interface devices (non-HID) to a second communication hub;
    communicating the information from the KVM switch to only a first of plural information handling systems interfaced with the display through a third communication hub, the third communication hub interfaced with both the first and second communication hubs; and
    selectively communicating information from the plural communication ports simultaneously to both the first of the plural information handling systems and a second of the plural information handling systems, the second of the plural information handling systems interfaced through a fourth communication hub, the fourth communication hub interfaced with both the first and second communication hubs.

11. The method of claim 10 further comprising:
    communicating information from a peripheral storage device through the KVM switch to the first of the plural information handling systems; and
    communicating keyboard inputs from a keyboard through the KVM switch to the second of the plural information handling systems simultaneous with the communicating information from the peripheral storage device through the KVM switch to the first of the plural information handling systems.

12. The method of claim 10 further comprising:
    communicating information from a network communication device through the KVM switch to the first of the plural information handling systems; and
    communicating mouse inputs from a mouse through the KVM switch to the second of the plural information handling systems simultaneous with the communicating information from the network communication device through the KVM switch to the first of the plural information handling systems.

13. The method of claim 10 further comprising:
    interfacing a first portion of the communication ports to a first communication hub and a first multiplexer;
    interfacing a second portion of the communication ports to a second communication hub and a second multiplexer; and
    selecting with the first and second multiplexers to communicate both the first portion of the communication ports and the second portion of the communication ports with only the first of the plural information handling systems and to communicate the first portion of the communication ports with the first of the plural information handling systems and the second portion of the communication ports with the second of the plural information handling systems.

14. The method of claim 10 further comprising:
monitoring information communicated through the KVM switch to detect a first type of information and a second type of information;
detecting an end user input to command the KVM switch to interface the plural communication ports with a second of the plural information handling systems instead of the first of the plural information handling systems; and
in response to the monitoring and the detecting, interfacing the first type of information with the first of the plural information handling systems and interfacing the second type of information with the second of the plural information handling systems.

15. The method of claim 14 wherein:
the first type of information comprises one of a bulk, isochronous, control or interrupt transfer; and
the second type of information comprises keyboard inputs.

16. The method of claim 14 wherein:
the first type of information comprises a predetermined interface utilization; and
the second type of information comprises mouse inputs.

17. The method of claim 14 wherein:
the first type of information comprises a predetermined interface utilization; and
the second type of information comprises visual images for presentation at the display provided from the second of the plural information handling systems.

18. A display comprising:
a housing;
a display panel disposed in the housing and operable to present information as visual images;
a set of plural communication ports operable to interface with plural peripheral devices through a first communication hub that interfaces with human interface device (HID) peripherals and a second communication hub that interfaces with non-human interface device (non-HID) peripherals;
a first information handling system port operable to communicate with a first information handling system through a third communication hub that interfaces with both the first and second communication hubs;
a second information handling system port operable to communicate with a second information handling system through a fourth communication hub that interfaces with both the first and second communication hubs; and
a KVM switch communicatively coupled with the set of plural communication ports, the first information handling system port and the second information handling system port, the KVM switch selectively interfacing all of the set of plural communication ports with the first information handling system port, all of the set of plural communication ports with the second information handling system port, and a portion of the set of plural communication ports simultaneously with both the first information handling system port and the second information handling system port by coordinating communication of HID peripherals and non-HID peripherals with management of the interfaces of the first and second communication hubs and the third and fourth communication hubs.

19. The display of claim 18 further comprising:
a processing resource operable to process information with instructions;
a non-transitory memory operable to store the instructions; and
instructions stored in the non-transitory memory and operable when executed on the processing resource to cause:
monitoring information communicated from the set of plural communication ports to detect a predetermined type of information; and
in response to detecting the predetermined type of information and an end user selection to change from an interface of all of the set of plural communication ports with the first information handling system to an interface of all of the set of plural communication ports with the second information handling system, instead changing the interface of only a portion of the set of plural communication ports to the second information handling system to maintain the interface of the predetermined type of information with the first information handling system.

20. The display of claim 19 wherein the KVM switch further comprises:
a first set of plural USB hubs interfaced with the first information handling system port and the second information handling system port;
a second set of plural USB hubs interfaced with the plural communication ports; and
a set of plural multiplexers cascaded to the first set of USB hubs and interfaced with the second set of USB hubs to selectively interface the communication ports with the first and second information handling system ports.

* * * * *